J. I. MICHAELS & L. GILLETTE.
FLEXIBLE FRICTION SPLICE FOR WELL DRILLING.
APPLICATION FILED MAR. 15, 1911.
999,461.  Patented Aug. 1, 1911.
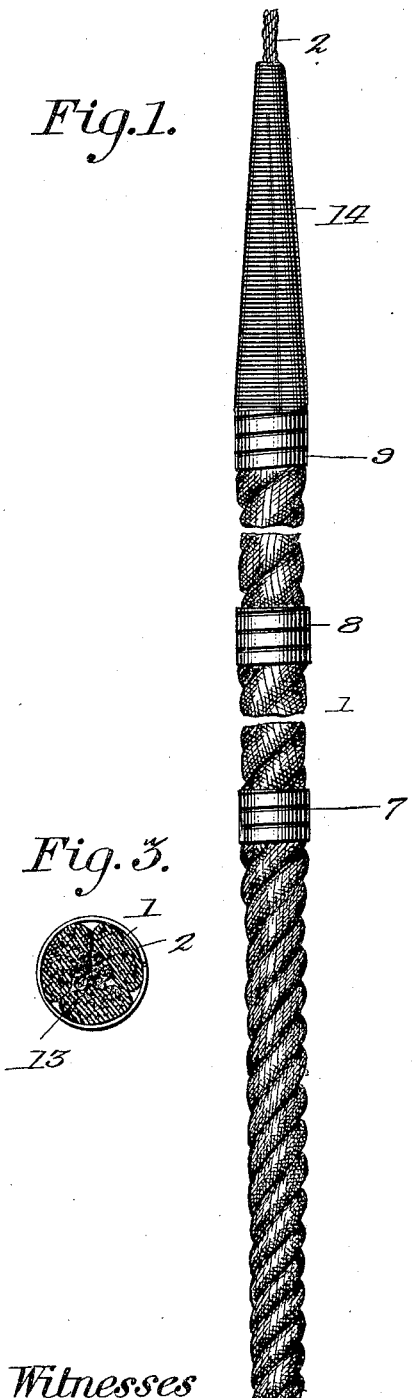
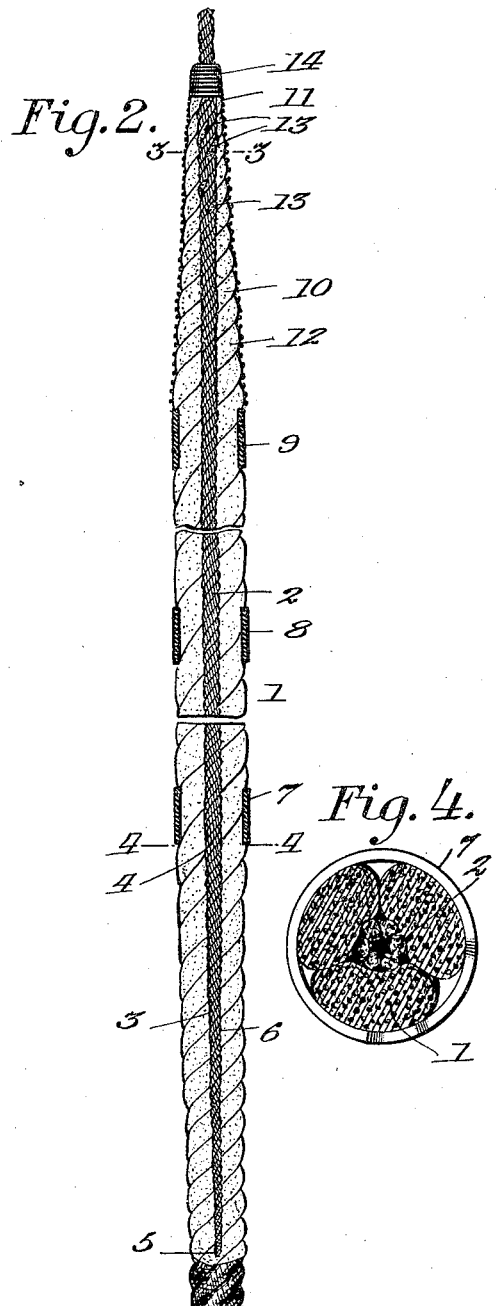
Witnesses
Philip E. Barnes
Asa Albright
James I. Michaels
Leverne Gillette
Inventors
E. B. Stocking
Atty.

UNITED STATES PATENT OFFICE.

JAMES I. MICHAELS AND LEVERNE GILLETTE, OF FAIRMONT, WEST VIRGINIA.

FLEXIBLE FRICTION-SPLICE FOR WELL-DRILLING.

999,461. Specification of Letters Patent. Patented Aug. 1, 1911.

Application filed March 15, 1911. Serial No. 614,522.

*To all whom it may concern:*

Be it known that we, JAMES I. MICHAELS and LEVERNE GILLETTE, citizens of the United States, residing at Fairmont, county of Marion, State of West Virginia, have invented certain new and useful Improvements in Flexible Friction-Splices for Well-Drilling, of which the following is a specification, reference being had therein to the accompanying drawing.

This invention relates to certain new and useful improvements for splicing Manila cable or rope to a wire rope which combination is now used in drilling oil wells or other deep holes, the object being to overcome the disadvantages now existing with splices in use for this purpose.

Another object of the invention is to provide a splice which is as strong as either of the ropes being spliced together and at the same time to form a splice which is small enough to allow a rope knife to be passed down through a five inch casing around the splice and on to the drill tool and there cut the Manila cable or rope in case of a tool becoming fastened in the hole, thereby saving the loss of any cable or rope.

A further object of the invention is to provide a splice which consists of a wire cable laid into the center of a Manila cable which is accomplished by partly untwisting the Manila cable which is formed of three plain laid ropes, a little at a time and pressing the wire cable in a spiral direction conforming to the spiral direction of the plain laid ropes of the Manila cable so as to cause the wire cable to take the position of a straight cylindrical core within the Manila cable.

Other and further objects and advantages of the invention will be hereinafter set forth and the novel features thereof defined by the appended claims.

In the drawing—Figure 1 is a view of the complete splice; Fig. 2 is a longitudinal central sectional view showing the wire cable in elevation; Fig. 3 is a transverse section taken on line 3—3 of Fig. 2; and Fig. 4 is a similar section taken on line 4—4 of Fig. 2.

Like numerals of reference refer to like parts in the several figures of the drawing.

In the drawing, 1 indicates a Manila cable and 2 a wire cable which may be of the ordinary construction now employed for well drilling machines to which this invention is particularly adapted to be used. The lower portion of the wire cable 2, as shown at 3 (Fig. 2) is gradually reduced in size from the point 4 to the end 5 by cutting out wires from each strand at intervals, as at 6, sufficiently to reduce the wire cable to a considerably smaller diameter, the wire cable preferably employed being formed of six strands of nineteen wires to the strand.

In placing the wire cable in position, the end portion of the Manila cable 1 is partly untwisted a little at a time and the reduced end portion of the wire cable 2 is forced in a spiral direction between the three plain laid ropes from which the Manila cable is preferably formed, conforming to the spiral direction of the plain laid ropes of the Manila cable so as to cause the wire cable to assume a straight cylindrical core within the Manila cable.

For holding the overlapping ends of the respective cables in their proper relation, we employ a number of coiled spring steel bands, 7, 8 and 9, which are placed upon the Manila cable beyond the point of the splice when the wire cable is being forced into position in order to allow the bands to be drawn back into the positions as shown and compressed by a suitable steel clamp, not shown. In this position, they compress the plain laid ropes of the Manila cable tightly against the wire cable making a frictional joint between the outer surface of the wire cable and the inner surface of the Manila cable and by constructing these bands in the form of a coiled spring, a continuous pressure is applied upon the splice in order to press the plain laid ropes of the Manila cable tightly against the wire cable, as they decrease in size from stretch and wear.

The upper end of the Manila cable or rope, as shown at 10, (Fig. 2) is gradually reduced in size from the spring clamp 9 to its end 11, by cutting out yarns of the three strands (a Manila cable-laid rope being formed of three plain laid ropes of three strands, each strand being formed of several yarns which yarns are made up of Manila fibers) at intervals, as at 12, sufficient to reduce the cable or rope to a small diameter, as at 11; the ends of the strands of each of the plain laid ropes of which the cable is composed being run under one or two of the wire strands of the wire rope, which is, in other words, through the wire rope as at 13;

a pull on the wire rope and Manila cable causing the strands of the wire rope to take a friction grip on the strands of the plain laid ropes of the Manila cable or rope, said ends of the plain laid ropes of the Manila cable being firmly held causes the Manila cable to grip the wire rope tighter all along the splice when the load or pull is on the ropes. The tapered portions from upper spring clamps 9 to 11 are then wound with yarns or wire, as at 14, to make a friction tight joint between the outer surface of the wire rope and the inner surface of the Manila cable or rope.

It will be readily seen that the continued pull of the drilling tools on the cable, which has the end of each strand run under the strands of the wire rope and wound tight with yarn and the spring bands pressing tightly these strands against the wire rope causes the splice to get tighter and stronger, rather than loose as other splices do, and the splice is flexible.

Having described our invention and set forth its merits, what we claim and desire to secure by Letters Patent is—

1. A cable splice having its interlocking strands held under tension by a spring band.

2. A cable splice having flexible coiled spring metal bands surrounding the same.

3. A splice of the kind described composed of a Manila cable having a wire cable laid in the central part thereof without unlaying said Manila cable and spring compressing bands surrounding said splices.

4. A flexible frictional splice of a Manila cable with a wire cable having strands of the plain laid ropes of the Manila cable reduced at their ends and inserted under the strands of the wire cable, said reduced portion being bound by strands of yarns or wire forming a frictional joint between the outer surface of the wire cable and the inner surface of the Manila cable and compressing members surrounding said splices.

5. A splice for connecting metallic cables to non-metallic cables comprising a non-metallic cable having a reduced end, a metallic cable having a reduced end arranged within the non-metallic cable, a binding arranged over the reduced end of the non-metallic cable, and flexible bands surrounding the overlapping portions of said cables.

6. A splice for metallic and non-metallic cables comprising a metallic cable having a reduced end laid within the non-metallic cable, the reduced end of the non-metallic cable being laced between the strands of the metallic cable, and coiled spring bands arranged over the overlying portion of said non-metallic cable.

7. A cable splice having its end sections twisted together, and spiral spring metal bands surrounding the overlying portion of said cable.

8. A cable splice having its sections united by twisting the end of one cable within the other cable, the ends of the respective cables being reduced, the end of the outer cable being laced in the inner cable, a binding arranged around the end of the outer cable, and spaced coiled spring metal bands arranged over the overlying portion of the outer cable for holding the respective cables in frictional engagement.

9. A flexible frictional splice of a Manila cable with a wire cable, having the Manila cable clamped tightly around the wire cable by steel coiled spring bands, said spring bands decreasing in diameter and clamping the splice tightly as the same decreases in diameter from stretch and wear.

In testimony whereof we affix our signatures in presence of two witnesses.

JAMES I. MICHAELS.
LEVERNE GILLETTE.

Witnesses:
FREDERIC HELMICK,
CLAUDE L. WOOD.